G. JACKSON.
SPRAYING HEAD.
APPLICATION FILED NOV. 14, 1910.

996,767.

Patented July 4, 1911.

Witnesses

George Jackson,
Inventor

Attorneys

UNITED STATES PATENT OFFICE.

GEORGE JACKSON, OF CLEVELAND, OHIO, ASSIGNOR TO CLEVELAND AUTOMATIC STREET FLUSHING AND NOZZLE COMPANY, OF CLEVELAND, OHIO, A CORPORATION OF OHIO.

SPRAYING-HEAD.

996,767.    Specification of Letters Patent.    Patented July 4, 1911.

Application filed November 14, 1910. Serial No. 592,263.

*To all whom it may concern:*

Be it known that I, GEORGE JACKSON, citizen of the United States, residing at Cleveland, in the county of Cuyahoga and State of Ohio, have invented certain new and useful Improvements in Spraying-Heads, of which the following is a specification.

This invention relates to apparatus for flushing and sprinkling streets or the like, and it includes a sprinkling head or nozzle through which the water is discharged, as well as mechanisms for controlling the same.

The sprinkling head or nozzle is characterized by a cylindrical casing to which the pipe from the water tank is attached, and a turning plug in said casing, the plug having therein a cavity of special form, which when the head is opened, leads to a slotted mouth or opening through which the water is discharged, and the valve may be adjusted so that the flow of water is controlled to produce either a flushing or sprinkling effect, in either case the water discharged being spread out or distributed.

The invention is illustrated in the accompanying drawings in which—

Figure 1:
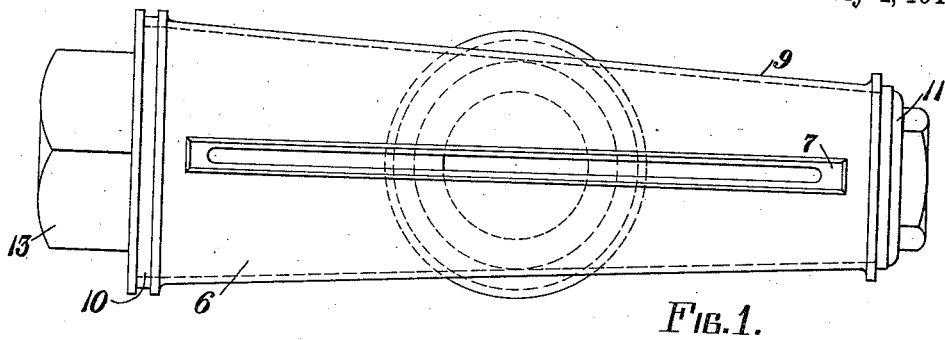
Figure 2:
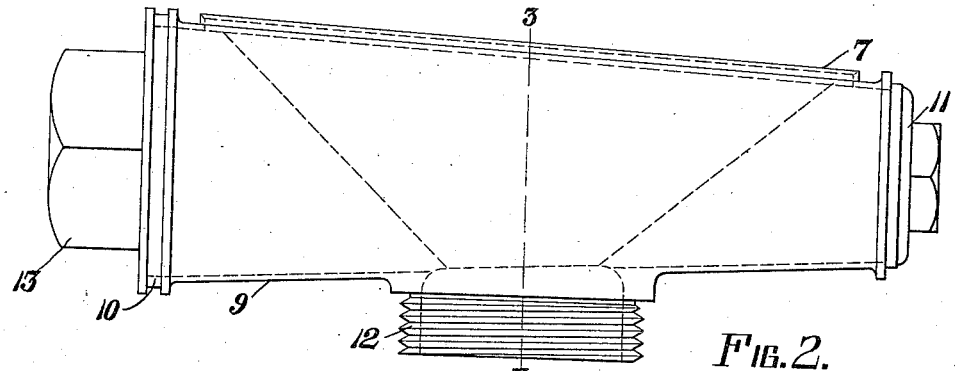
Figure 4:
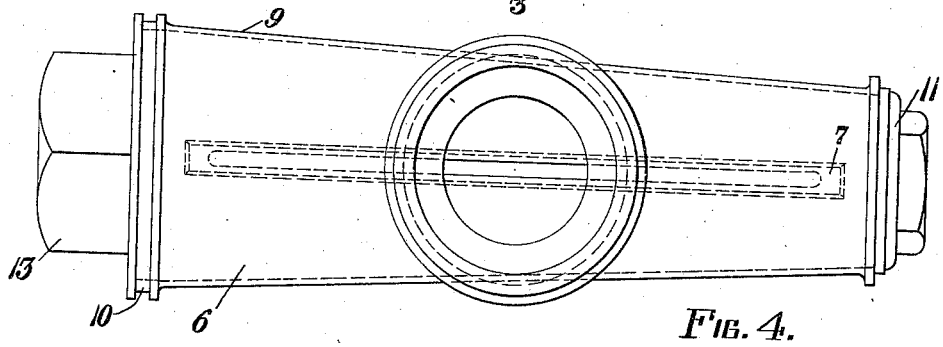
Figure 3:
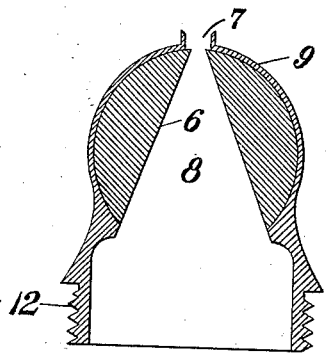

Figure 1 is a face or front view of the sprinkling head. Fig. 2 is a side view. Fig. 3 is a section on the line 3—3 of Fig. 2. Fig. 4 is a back view.

Referring specifically to the drawings, 9 indicates a tapered tubular casing provided on one side with the inlet connection 12 and on the other side with an outlet mouth or slot 7 which extends lengthwise almost the whole length of the casing, and has projecting lips as shown. Fitting within this casing is a tapered plug 6 which may be turned to open or close the head. This plug has extending through the same a converging passage 8. The opening to this passage at one side is circular, corresponding substantially in size and shape to the end of the inlet 12, and from this opening the walls of the passage diverge in a longitudinal plane and converge in a transverse plane to produce, on the opposite side of the plug, an outlet opening corresponding in size and shape and position to that of the mouth 7. The plug is provided with suitable means to hold it in place, such as a nut 11 at the small end, and a gasket 10 at the large end, to prevent leak, and the stem of the plug is squared as at 13 or otherwise shaped to receive an operating lever or device.

With respect to the action of the head, water which enters the same through the inlet 12 will spread laterally in the triangular passage 8 and will thus be discharged in a sheet through the mouth 7 when the head is fully opened. By partially closing the same the outflow is restricted and the water will be discharged in a thinner sheet or spray, this action being assisted by the lips beside the mouth 7, against which the thin sheet of water will impinge when the valve is only partly opened, the inclination of the side walls of the passage 8 tending in such case, to direct the flow toward the corresponding lip at the mouth of the casing. When it is desired to flush the street the head is opened to full extent; for sprinkling purposes the opening is decreased until the desired effect is produced.

The simplicity of the parts and ease of control are obvious and leakage may be practically prevented.

Having thus described my invention, what I claim as new and desire to secure by Letters Patent is:—

1. A spraying head comprising a casing having a slot therein for discharge, and a turning plug in the casing, having a passage through the same said passage having walls which diverge in a longitudinal plane and converge in a transverse plane, forming a narrow outlet opening corresponding to the slot in the casing.

2. A spraying head comprising a casing having a longitudinal slot therein forming a mouth, and lips projecting along said mouth, and a turning plug in the casing having a passage therethrough with opposite walls converging in a transverse plane toward said mouth, when the plug is in open position, said passage also having opposite walls diverging in a longitudinal plane.

3. A spraying head comprising a casing having a longitudinal discharge slot in one side and an inlet in the other side, and a turning plug in the casing, having a cross passage through the same, said passage diverging lengthwise of the plug from the inlet side to the outlet side, and converging crosswise, forming a slot at the outlet side corresponding to the slot in the casing.

In testimony whereof, I do affix my signature in presence of two witnesses.

GEORGE JACKSON.

Witnesses:
STEDMAN J. ROCKWELL,
PAUL E. BAIRD.

Copies of this patent may be obtained for five cents each, by addressing the "Commissioner of Patents, Washington, D. C."